United States Patent [19]

Inaba et al.

[11] Patent Number: 5,624,655
[45] Date of Patent: Apr. 29, 1997

[54] PROCESS FOR PURIFYING HYDROGEN PEROXIDE AQUEOUS SOLUTION

[75] Inventors: Yukio Inaba; Yohsuke Ueno; Takayuki Tsujino; Tohru Murakami, all of Ube, Japan

[73] Assignee: Ube Industries, Ltd., Yamaguchi-ken, Japan

[21] Appl. No.: 946,595

[22] Filed: Sep. 18, 1992

[30]   Foreign Application Priority Data

Sep. 19, 1991  [JP]  Japan .................................. 3-311289
Nov. 26, 1991  [JP]  Japan .................................. 3-355392

[51] Int. Cl.$^6$ ............................................... C01B 15/01
[52] U.S. Cl. ........................................ 423/584; 423/588
[58] Field of Search ................................. 423/584, 588

[56]              References Cited

U.S. PATENT DOCUMENTS 3,664,812   5/1972   Hoyt .

FOREIGN PATENT DOCUMENTS 824607    7/1969    Canada .................................. 423/584
1581200   9/1969    France .................................. 423/584
14-3002   3/1939    Japan .
48-41158  12/1973   Japan .

Primary Examiner—Wayne Langel
Attorney, Agent, or Firm—Finnegan, Henderson, Farabow, Garrett & Dunner, L.L.P.

[57]              ABSTRACT

This invention relates to a process for purifying a hydrogen peroxide aqueous solution, which comprises bringing a high concentration hydrogen peroxide aqueous solution containing a large amount of phosphoric acid obtained by extracting with water a reaction mixture prepared by a method of forming hydrogen peroxide by an oxidation-reduction process of anthraquinones, into contact with specific active alumina particles at a temperature of 0° to 50° C. for 6 to 500 minutes to remove a phosphoric acid component from the above high concentration hydrogen peroxide aqueous solution at a high rate substantially without causing decomposition of hydrogen peroxide.

12 Claims, 1 Drawing Sheet

PROCESS FOR PURIFYING HYDROGEN PEROXIDE AQUEOUS SOLUTION

BACKGROUND OF THE INVENTION

This invention relates to a process for purifying a hydrogen peroxide aqueous solution, which comprises bringing "a hydrogen peroxide aqueous solution containing a large amount of phosphoric acid, etc." obtained by extracting with water a reaction mixture prepared by a method of forming hydrogen peroxide by an oxidation-reduction process of anthraquinones (the so-called anthraquinone process) into contact with specific active alumina particles at a relatively low temperature for a specific time, and can remove a phosphoric acid component from the above hydrogen peroxide aqueous solution with a high rate substantially without causing decomposition of hydrogen peroxide.

As a method for preparing a hydrogen peroxide aqueous solution, there has been generally employed a method in which a hydrogen peroxide aqueous solution is obtained by extracting with water a reaction mixture prepared by a method of forming hydrogen peroxide by an oxidation-reduction process of anthraquinones (the so-called anthraquinone process). In the above preparation method, phosphoric acids have been frequently added for various purposes.

In the prior art, as a method for removing an acid component such as a phosphoric acid component, sulfuric acid and acetic acid in a hydrogen peroxide aqueous solution, there has been known, for example, an ion exchange resin method in which an acid component is adsorbed and removed by using an ion exchange resin such as Amberlite (produced by Organo K. K.), etc. as disclosed in Japanese Patent Publication No. 3002/1964. In this method, although an acid component such as phosphoric acid can be removed, there involves a problem that ion exchange resin particles themselves are decomposed by hydrogen peroxide, and become unusable after several times of regeneration, so that the method was not practical.

As a method for removing a phosphoric acid ion component in a hydrogen peroxide aqueous solution, there has been disclosed in U.S. Pat. No. 3,664,812, a precipitation method in which phosphoric acid ions in the above hydrogen peroxide aqueous solution are reacted with an alkali earth metal compound such as a calcium compound, a barium compound, a magnesium compound, etc. under basic condition (pH 7 to 8.5) to form precipitates of calcium phosphate, etc., and the precipitates are removed by filtration. However, in the above precipitation method, since a reaction mixture becomes basic, there is a problem that hydrogen peroxide is extremely easily decomposed.

In Japanese Patent Publication No. 41158/1973, there has been disclosed an adsorption method in which a hydrogen peroxide aqueous solution substantially containing no phosphoric acid is purified by bringing the solution into contact with active alumina at about room temperature for a short time of 1 to 5 minutes so as to remove minute amounts of metal or organic impurities by adsorption, for the purpose of stabilizing a hydrogen peroxide aqueous solution by removing the above minute amounts of impurities in the hydrogen peroxide aqueous solution.

However, the above adsorption method using active alumina does not have any specific disclosure about a hydrogen peroxide aqueous solution containing an excessive amount of a phosphoric acid component ($PO_4$). Thus, it has not been known at all whether a phosphoric acid component can be removed with a high removal rate or not when using the above hydrogen peroxide aqueous solution containing an excessive amount of a phosphoric acid component which remains after used for various purposes. Further, the above method involves problems that considerable loss of active alumina is caused when the above active alumina used for adsorption of a phosphoric acid component and thus being in a saturated state is regenerated by removing a phosphoric acid component with an inorganic base aqueous solution, or when regenerated active alumina is reused for removing a phosphoric acid component in a hydrogen peroxide aqueous solution, hydrogen peroxide is decomposed and a hydrogen peroxide aqueous solution which is a final product is contaminated with considerable amounts of components which corrode storage containers made of alumina, whereby quality of a hydrogen peroxide aqueous solution is worsened.

SUMMARY OF THE INVENTION

An object of this invention is to provide a method of purifying a hydrogen peroxide aqueous solution industrially in which the above high concentration hydrogen peroxide aqueous solution containing an excessive amount of phosphoric acid which remains after used for various purposes is used, and a phosphoric acid component ($PO_4$, etc.) can be removed easily from said hydrogen peroxide aqueous solution by using active alumina with a high removal rate substantially without causing decomposition of hydrogen peroxide, and yet active alumina to which a phosphoric acid component is adsorbed to a saturated state can be regenerated easily without loss of an alumina component, and further a phosphoric acid component in said hydrogen peroxide aqueous solution can be removed without any problem by using the regenerated active alumina to obtain a high purity hydrogen peroxide aqueous solution.

This invention relates to a process for purifying a hydrogen peroxide aqueous solution, which comprises bringing a hydrogen peroxide aqueous solution containing 50 to 10,000 ppm of a phosphoric acid component obtained by extracting with water a reaction mixture containing hydrogen peroxide formed by an oxidation-reduction process of anthraquinones into contact with active alumina particles containing 90% or more of an alumina component in terms of $Al_2O_3$ and having a specific surface area of 100 to 600 $m^2/g$ at a temperature of 0° to 50° C. for 6 to 500 minutes to remove the phosphoric acid component from the above hydrogen peroxide aqueous solution.

This invention also relates to a process for purifying a hydrogen peroxide aqueous solution in which a hydrogen peroxide aqueous solution containing a phosphoric acid component obtained by extracting with water a reaction mixture containing hydrogen peroxide formed by an oxidation-reduction process of anthraquinones is brought into contact with active alumina particles to remove the phosphoric acid component from said hydrogen peroxide aqueous solution by adsorbing it to the active alumina particles, which comprises using active alumina particles containing 90% or more of an alumina component in terms of $Al_2O_3$ and having a specific surface area of 100 to 600 $m^2/g$, and bringing the above hydrogen peroxide aqueous solution into contact with said active alumina particles at 0° to 50° C. for 6 to 500 minutes to remove a phosphoric acid component from said hydrogen peroxide aqueous solution, bringing said active alumina particles lowered in property of removing a phosphoric acid component due to attachment of a large amount of a phosphoric acid component into contact with an inorganic base aqueous solution to elute and remove the phosphoric acid component from said particles, and then bringing said active alumina particles into contact with 10% by weight or less of an inorganic acid aqueous solution to remove an inorganic base component from said particles, if necessary, followed by washing with water, to regenerate the active alumina particles and reusing the above regenerated active alumina particles for removing a phosphoric acid component from the above hydrogen peroxide aqueous solution containing an phosphoric acid component obtained by extracting with water a reaction mixture containing hydrogen peroxide formed by the oxidation-reduction process of anthraquinones.

DESCRIPTION OF THE PREFERRED EMBODIMENTS

Figure 1:
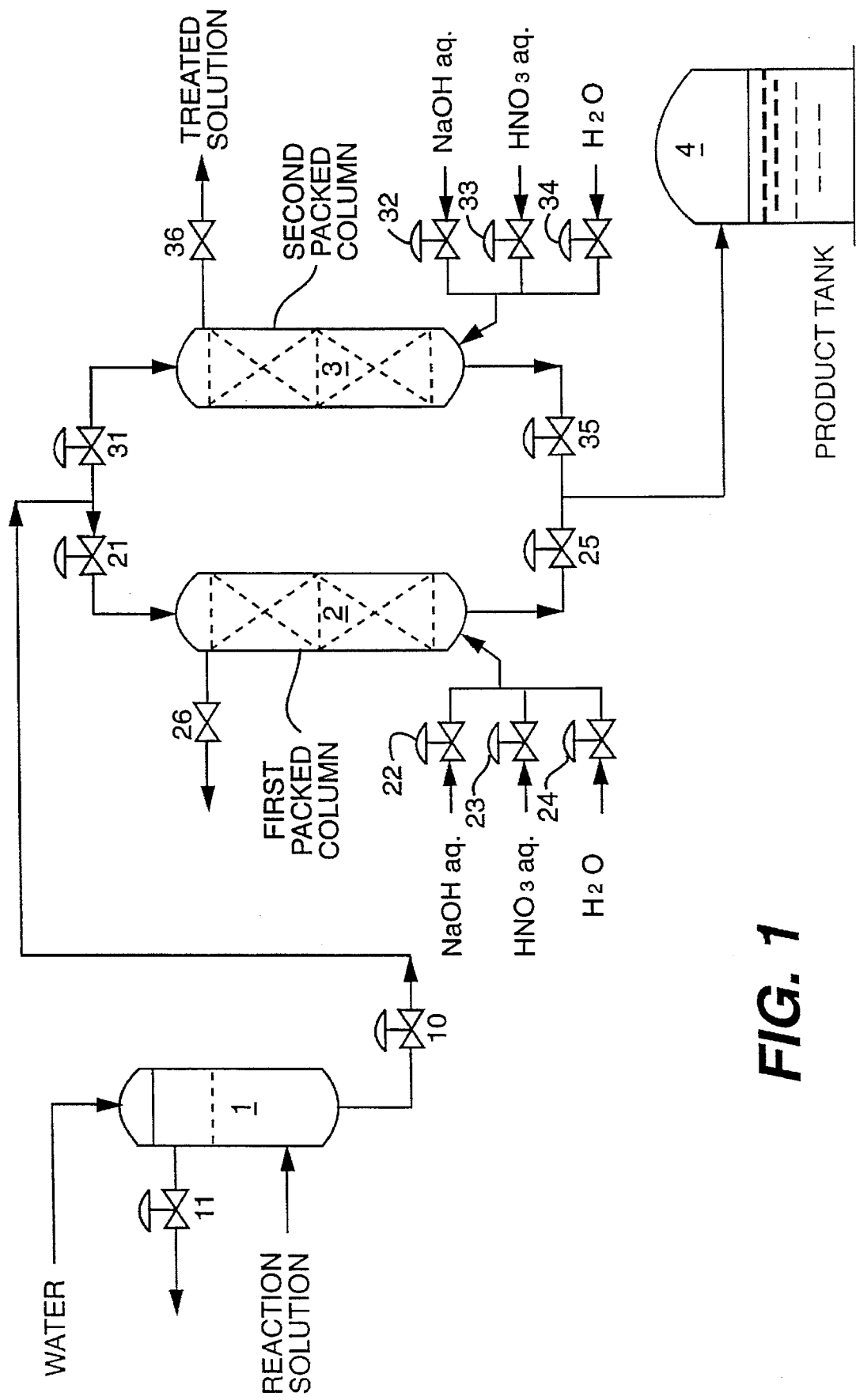
FIG. 1 is a flow chart showing one example of "a purifying instrument by which an operation for regenerating active alumina particles can be also carried out" in the purification process of this invention.

As a representative embodiment of the purification process of this invention, as shown in FIG. 1, there may be suitably mentioned a process for continuously purifying a hydrogen peroxide aqueous solution, which comprises A) feeding a hydrogen peroxide aqueous solution containing a phosphoric acid component obtained by extracting with water in an extraction column 1 a reaction mixture containing hydrogen peroxide formed by an oxidation-reduction process of anthraquinones into the first packed column 2 in which the active alumina particles are packed to remove the phosphoric acid component from said hydrogen peroxide aqueous solution by adsorbing it to the active alumina particles, and simultaneously with B) a) after terminating feeding of the hydrogen peroxide aqueous solution into the second packed column 3 packed with active alumina particles to which a large amount of a phosphoric acid component is adsorbed so that property of removing a phosphoric acid component is lowered, feeding an inorganic base aqueous solution into said second packed column 3 to elute and remove the phosphoric acid component from said particles, and then b) feeding an inorganic acid aqueous solution into the second packed column 3 to remove an inorganic base component from said particles, and when the pH of the treated aqueous solution discharged from said packed column becomes about 4 to 6, immediately terminating feeding of the inorganic anic acid aqueous solution, and finally feeding water into said packed column and washing with water to regenerate the active alumina particles within the second packed column, and repeating 1) removal of a phosphoric acid component in the hydrogen peroxide aqueous solution in the above step A) and 2) regeneration of the active alumina particles in the above step B) alternately in the above first packed column 2 and second packed column 3.

In this invention, when regenerating active alumina particles to which a phosphoric acid component is adsorbed in a saturated state, the most important point is that active alumina particles are brought into contact with an inorganic base aqueous solution to remove a phosphoric acid component from said particles, and then brought into contact with an inorganic acid aqueous solution to remove inorganic base from said particles. In the case where active alumina particles substituted by an inorganic base are not treated with a low concentration inorganic acid aqueous solution such as a nitric acid aqueous solution, etc., when the particles are reused for removing a phosphoric acid component in a hydrogen peroxide aqueous solution, the inorganic base adsorbed to the active alumina particles may become an obstacle to adsorption of a phosphoric acid component, or may be eluted out in place of a phosphoric acid component in a hydrogen peroxide aqueous solution, whereby hydrogen peroxide is considerably decomposed undesirably.

The hydrogen peroxide aqueous solution to be used in the purification process of this invention can be obtained by extracting with water in an extraction column 1 a reaction mixture containing hydrogen peroxide formed by an oxidation-reduction process of anthraquinones and if necessary, by removing an organic solvent, etc. remained in the extract by extraction with an organic solvent and then condensing the resulting extract (aqueous phase) suitably. The hydrogen peroxide aqueous solution may preferably contain 20 to 80% by weight, particularly preferably 25 to 75% by weight of hydrogen peroxide, and an excessive amount of preferably about 50 to 10,000 ppm, particularly preferably about 100 to 1,000 ppm of a phosphoric acid component.

The purification process of this invention can be carried out under adsorption conditions accompanied with almost no decomposition of hydrogen peroxide. Thus, it can be suitably applied to removal of a phosphoric acid component from a hydrogen peroxide aqueous solution containing a high concentration of about 40 to 75% by weight of hydrogen peroxide.

The above hydrogen peroxide aqueous solution may contain a minute amount, i.e. 10 ppm or less, preferably about 1 ppm or less of a metal such as iron, manganese, chromium, sodium, calcium and aluminum or ions thereof, or 200 ppm or less, preferably about 100 ppm or less of organic impurities, etc.

The active alumina particles to be used in the purification process of this invention may be active alumina particles, preferably active γ-alumina particles containing 90% or more, preferably 95% by weight of an alumina component in terms of $Al_2O_3$ and having a specific surface area of 100 to 600 m$^2$/g, preferably 120 to 500 m$^2$/g.

The above active alumina particles preferably have a particle size of 3 to 50 mesh, particularly 4 to 30 mesh, more preferably about 5 to 20 mesh.

As the above active alumina particles, there may be preferred "active alumina particles containing almost no alkali component" which contains 0.1% by weight or less, preferably 0.05% by weight or less of iron atom in terms of $Fe_2O_3$, each 10 ppm or less of chromium, copper and nickel atoms, and 0.3% by weight or less, particularly 0.2% by weight or less, more preferably 0.1% by weight or less of a sodium component in terms of $Na_2O$, for the purposes of lowering decomposition rate of hydrogen peroxide and providing a high level of adsorption property of a phosphoric acid component.

If necessary, the active alumina particles may be washed with water or an aqueous solution of an inorganic acid such as dilute nitric acid, hydrochloric acid, sulfuric acid, etc., preferably with a 0.1 to 5% by weight, particularly with a 0.5 to 5% by weight nitric acid aqueous solution so as to substantially remove an alkali component on the surfaces of the active alumina particles.

Further, the active alumina particles preferably has a saturation adsorption ratio of its phosphoric acid component (maximum adsorption amount of phosphoric acid component/active alumina particle) of 2 to 20% by weight, particularly about 3 to 15% by weight, more preferably about 5 to 12% by weight at 30° C., because an operation of adsorbing a large amount of a phosphoric acid component in a hydrogen peroxide aqueous solution can be carried out repeatedly for a long time, and active alumina particle-packed beds within the packed column (including the first and second packed columns) can be regenerated alternately at suitable and long intervals as described below.

In the purification process of this invention, the above active alumina particles are preferably packed in a packed portion of an adsorption column (including the first and second adsorption packed columns) where a phosphoric acid component, etc. are adsorbed and removed from a hydrogen peroxide aqueous solution to form an active alumina particle-packed bed so that a packed density to the adsorption column becomes about 500 to 1,000 g (active alumina particle)/liter (volume of packed portion in adsorption column), particularly preferably about 600 to 900 g/liter.

In the purification process of this invention, the above hydrogen peroxide aqueous solution is brought into contact with the above active alumina particles at a temperature of 0° to 50° C., preferably 5° to 40° C. for 6 to 500 minutes, preferably 6 to 200 minutes, more preferably 8 to 100 minutes to adsorb and remove an phosphoric acid component from the above hydrogen peroxide aqueous solution. In this invention, as the above temperature during adsorption becomes lower, decomposition rate of hydrogen peroxide in the hydrogen peroxide aqueous solution tends to be lowered, but the adsorption amount of phosphoric acid components to the active alumina particles tends to be decreased at a low temperature near 0° C.

In the purification process of this invention, there may be employed a batchwise method in which the active alumina particles are dispersed in the hydrogen peroxide aqueous solution at a suitable rate, and while stirring the resulting solution, a phosphoric acid component is adsorbed and removed. In that case, the weight ratio of the active alumina particles to the hydrogen peroxide aqueous solution is preferably ½ to ¹/₁₀₀, particularly about ⅕ to ¹/₅₀.

The regenerating step B) of the active alumina particles to which a large amount of a phosphoric acid component, etc. is adsorbed in a substantially saturated state by purifying the hydrogen peroxide aqueous solution according to the above batch system can be carried out as follows:

a) the active alumina particles separated from the hydrogen peroxide aqueous solution are washed with water, and, if necessary, washed with an aqueous solution of an inorganic base such as alkali metal hydroxide including caustic soda and caustic potash, etc. (about 0.1 to 20% by weight, particularly 0.5 to 10% by weight, and 2 to 30-fold volume, particularly 5 to 20-fold volume of active alumina particle volume) at a temperature of 0° to 100° C., particularly 0° to 50° C. to remove the phosphoric acid component adsorbed therein, followed by washing with pure water, if necessary, and b) the particles are further washed with a minimum amount of an aqueous solution of an inorganic acid such as nitric acid, etc. (10% by weight or less, preferably 0.01 to 5% by weight, particularly about 0.05 to 2% by weight, and 1 to 10-fold volume, particularly 1 to 5-fold volume of active alumina particle volume) and finally washed again with water to regenerate property of adsorbing a phosphoric acid component.

Further, in this invention, as shown in FIG. 1, it is industrially suitable that active alumina particles are packed in the first packed column 2 and the second packed column 3 so that the packed densities become about 500 to 1,000 g/liter, respectively, to form the respective active alumina particle-packed bed, and continuous purification for removing a phosphoric acid component from a hydrogen peroxide aqueous solution is carried out as follows:

A) with the valves 10, 11, 21 and 25 opened, and the valves 31 and 35, and 22 to 24 and 26 closed, an hydrogen peroxide aqueous solution extracted from an aqueous phase of the extraction column 1 is continuously fed into the first packed column 2 to adsorb a phosphoric acid component, and the resulting hydrogen peroxide aqueous solution is recovered in the product tank 4, and simultaneously B) a) in the second packed column 3, a phosphoric acid component is adsorbed to the active alumina particles in a saturated state, after opening the valve 36 which is a discharging line of the respective processing solutions, the valve 34 is opened to carry out water washing, if necessary, and then the valve 32 is opened and an inorganic base aqueous solution such as a caustic soda aqueous solution is fed thereinto to remove the phosphoric acid component of the active alumina particles, and then b) the valve 33 is opened, and 10% by weight or less of an inorganic acid aqueous solution such as a nitric acid aqueous solution, etc. is fed in an amount as little as possible, and if necessary, followed by opening the valve 34, feeding pure water and washing with water, to remove inorganic base in the active alumina particles while suppressing elution of an alumina component as far as possible, whereby the active alumina particle-packed bed is regenerated, and thereafter, by changing opening and closing of the respective valves of the first packed column 2 and the second packed column 3, removal of a phosphoric acid component in the hydrogen peroxide aqueous solution and regeneration of the active alumina particles described above are repeated alternately at appropriate intervals.

When a nitric acid aqueous solution is fed into the above active alumina particle-packed bed, it is preferred to terminate feeding of the nitric acid aqueous solution within about 10 minutes, particularly within 5 minutes immediately after the pH value of the processing solution reaches 4 to 6, and then carry out sufficient water washing in order to prevent excessive adsorption of nitric acid to the active alumina particles.

In this invention, when the active alumina particles to which a phosphoric acid component is adsorbed in a saturated state is treated with an inorganic base aqueous solution, and then treated with an inorganic acid aqueous solution, if too large amounts of high concentration inorganic base aqueous solution and inorganic acid aqueous solution are used, a considerably large amount of an alumina component of the active alumina particles is eluted, whereby loss of the active alumina particles is caused or a large amount of an inorganic acid is adsorbed to the regenerated active alumina particles. Further, when the regenerated active alumina particles are used for removing an phosphoric acid component from the hydrogen peroxide aqueous solution, a large amount of an inorganic acid component is eluted in the hydrogen peroxide aqueous solution undesirably.

Further, in the purification process of this invention, preferred is a continuous process in which the active alumina particles are packed in a packed portion of an adsorption column to form an active alumina particle-packed bed so that the packed density becomes about 500 to 1,000 g/liter, the hydrogen peroxide aqueous solution is continuously fed into the adsorption column, and a phosphoric acid component is adsorbed and removed. This continuous means is suitable. In this case (inclusive of the first and the second packed columns are used), the SV value (1/Hr: feeding amount of peroxide aqueous solution/volume of active alumina particle bed) is preferably 0.5 to 10, particularly about 0.6 to 6, and the time during which the hydrogen peroxide aqueous solution is brought into contact with the active alumina particle bed (residence time in packed bed of hydrogen peroxide aqueous solution) is preferably 6 to 120 minutes, particularly about 10 to 100 minutes.

In this invention, the above packed column (inclusive of the first and the second packed columns) may be of any type, but there may be preferred, for example, a tubular vessel having a feeding inlet of the hydrogen peroxide aqueous solution and a discharging outlet of the hydrogen peroxide aqueous solution from which phosphoric acid, etc. are removed at the opposite ends thereof, as well as feeding inlets of an inorganic base aqueous solution, an inorganic acid aqueous solution and pure water, and discharging outlets of these processing solutions at the opposite ends thereof, and the active alumina particles are preferably packed to have a suitable packed layer height (L) in the central portion of the packed column. A porous plate is preferably provided at the bottom of the above packed layer (inclusive of the first and the second packed layers) so as to support the packed layer of the active alumina particles described above.

If necessary, the above packed column (inclusive of the first and the second packed columns) may be equipped with a cooling means for cooling the hydrogen peroxide aqueous solution with high temperature (e.g. a cooling jacket surrounding a packed column, a cooling tube provided at a feeding side within a packed column, etc.) so that adsorption can be effected at a low temperature of about 0° to 40° C.

In this invention, the hydrogen peroxide aqueous solution is preferably fed into the above packed column (inclusive of the first and the second packed columns) which is set up perpendicularly. In that case, the hydrogen peroxide aqueous solution may be flown from the upper side to the lower side of the packed column, or flown from the lower side to the upper side of the packed column.

In this invention, the active alumina particles to which phosphoric acid, etc. are adsorbed by carrying out the above purification are washed with an aqueous solution (about 0.1 to 20% by weight, particularly 0.5 to 10% by weight) of an alkali metal hydroxide such as caustic soda, caustic potash, etc. once to 5 times, particularly once to 3 times, at a temperature of 0° to 100° C., particularly 0° to 50° C., and if necessary, further washed with pure water and/or an aqueous solution containing 10% by weight or less (preferably about 0.01 to 10% by weight, particularly 0.05 to 5% by weight) of an inorganic acid such as nitric acid, etc., whereby an adsorbed phosphoric acid component can be removed and adsorption property can be regenerated easily. A caustic soda aqueous solution having a concentration of 0.5 to 4% by weight is most preferably used. Thus, the active alumina particles can be used again for adsorption in the hydrogen peroxide aqueous solution.

In this invention, as the inorganic acid aqueous solution to be used for regenerating the active alumina particles, there may be used an aqueous solution of an inorganic acid such as nitric acid, sulfuric acid, hydrochloric acid, etc., having a concentration of 5% by weight or less, particularly suitably a nitric acid aqueous solution having a concentration of 0.05 to 2% by weight.

A nitric acid aqueous solution is suitably used as an inorganic acid aqueous solution since, even when the regenerated active alumina particles are used for removing a phosphoric acid component from the hydrogen peroxide aqueous solution and the nitric acid is migrated in the hydrogen peroxide aqueous solution, if the nitric acid component is contained in the hydrogen peroxide aqueous solution in an amount of about 100 ppm or less, particularly about 1 to 50 ppm, a nitric acid component in the regenerated active alumina particles has the effect of rather preventing corrosion, caused by hydrogen peroxide, of aluminum vessels in which a hydrogen peroxide aqueous solution is charged.

EXAMPLES

In Examples, the hydrogen peroxide concentration of the hydrogen peroxide aqueous solution was measured by the titration method using a potassium permanganate solution according to JIS K1463, and the concentration of the phosphoric acid component was measured according to the adsorptiometric method using vanadomolybdophosphoric acid [Analytical Chemistry Handbook (Second Edition) p. 208, publishing company: Maruzen, published date: February, 1978].

The chemical compositions and physical properties of the active alumina particles used in the following Examples are shown in Table 1. In each Example, the active alumina particles obtained by washing with a dilute nitric acid aqueous solution (concentration: 5% by weight) were used, respectively.

TABLE 1

| | Kind of active alumina particle | | | |
|---|---|---|---|---|
| | A | B | C | D |
| Kind | | | | |
| Name of maker | Mizusawa Kagaku Kogyo | Sumitomo Kagaku Kogyo | Sumitomo Kagaku Kogyo | Sumitomo Kagaku Kogyo |
| Name of grade | RN | KHD-24 | NKHD-24 | KGD-1442 |
| Chemical composition | | | | |
| $Al_2O_3$ (% by weight) | 99.7 | 99.7 | 99.7 | 99.7 |
| $Fe_2O_3$ (% by weight) | 0.04 | 0.02 | 0.02 | 0.02 |
| $SiO_2$ (% by weight) | 0.1 | 0.02 | 0.02 | 0.02 |

TABLE 1-continued

| | Kind of active alumina particle | | | |
|---|---|---|---|---|
| | A | B | C | D |
| Na$_2$O (% by weight) | 0.1≧ | 0.26 | 0.27 | 0.26 |
| Cr (ppm) | 5≧ | 5≧ | 5≧ | 5≧ |
| Ni (ppm) | 5≧ | 5≧ | 5≧ | 5≧ |
| Cu (ppm) | 10≧ | 10≧ | 10≧ | 10≧ |
| Physical properties | | | | |
| Particle size (mesh) | 6 to 12 | 5 to 10 | 5 to 10 | 14 to 42 |
| Particle size (mm) | 1.7 to 3.4 | 2 to 4 | 2 to 4 | 0.4 to 1.4 |
| Specific surface area (m$^2$/g) | 180 | 270 | 340 | 270 |
| Average pore diameter (Å) | 52 | 20 to 40 | 20 to 40 | 20 to 40 |
| Bulk specific gravity (g/l) | 650 | 880 | 650 | 630 |
| Saturation adsorption rate of phosphoric acid (% by weight) | 8≦ | 5≦ | 7≦ | — |

REFERENCE EXAMPLE 1

A reaction mixture containing hydrogen peroxide formed by oxidation and reduction of anthraquinones in the presence of a catalyst was extracted with water containing phosphoric acid to obtain an extract containing hydrogen peroxide. An organic solvent, etc. remaining in the extract were removed by organic solvent extraction, and the resulting extract was purified and condensed to obtain a hydrogen peroxide aqueous solution [hydrogen peroxide (H$_2$O$_2$): 60% by weight, phosphoric acid component (PO$_4$): 442 ppm and other organic and inorganic components: about 200 ppm].

REFERENCE EXAMPLE 2

In the same manner as in Reference example 1 except for changing conditions of the amount of phosphoric acid used, etc. in extraction with water in Reference example 1 described above, a hydrogen peroxide aqueous solution having a phosphoric acid component (PO$_4$) concentration of 354 ppm and a hydrogen peroxide (H$_2$O$_2$) concentration of 60% by weight was prepared.

REFERENCE EXAMPLE 3

In the same manner as in Reference example 1 except for changing conditions of the amount of phosphoric acid used, etc. in extraction with water of the reaction mixture obtained in Reference example 1 described above, a hydrogen peroxide aqueous solution having a phosphoric acid component (PO$_4$) concentration of 463 ppm and a hydrogen peroxide (H$_2$O$_2$) concentration of 60% by weight was prepared.

REFERENCE EXAMPLE 4

In the same manner as in Reference example 1 except for changing conditions of the amount of phosphoric acid used, etc. in extraction with water of the reaction mixture obtained in Reference example 1 described above, a hydrogen peroxide aqueous solution having a phosphoric acid component (PO$_4$) concentration of 386 ppm and a hydrogen peroxide (H$_2$O$_2$) concentration of 60% by weight was prepared.

REFERENCE EXAMPLE 5

In the same manner as in Reference example 1 except for changing conditions of the amount of phosphoric acid used, etc. in extraction with water of the reaction mixture obtained in Reference example 1 described above and a part of condensation conditions of the extract, a hydrogen peroxide aqueous solution having a hydrogen peroxide (H$_2$O$_2$) concentration of 60% by weight and a phosphoric acid component (PO$_4$) concentration of 1,740 ppm was prepared.

EXAMPLES 1 TO 3

As an adsorption column, there was used an adsorption column comprising a tubular vessel with a length of 400 mm and an inner diameter of about 22 mm equipped with a feeding inlet of the hydrogen peroxide aqueous solution at the lower portion and a discharging outlet for discharging the hydrogen peroxide aqueous solution treated by adsorption at the upper portion and also surrounded by a cooling jacket, in which formed was a packed bed (a porous plate having a large number of pores with a pore diameter of 1 mm was provided at the bottom of the packed bed) packed with 100 ml of active alumina particles (Type A: produced by Mizusawa Kagaku Kogyo K. K., Active Alumina RN, rough composition is shown in Table 1) having an average particle size of 3 mm and a specific surface area of 180 m$^2$/g with a packed height (L) of 300 mm. The above adsorption column was connected to a feeding means of the hydrogen peroxide aqueous solution and to a recovery vessel of a solution treated by adsorption, and set up perpendicularly.

Into the above packed column in which the packed bed (L: 300 mm) packed with 100 ml volume of the active alumina particles was formed, the hydrogen peroxide aqueous solution obtained in Reference example 1 described above was fed at feeding rates of 200 ml/hr (Example 1, SV value: 2), 500 ml/hr (Example 2, SV value: 5) and 1,000 ml/hr (Example 3, SV value: 10), respectively. Under conditions of an adsorption temperature of 30° C. and residence times of 30 minutes, 12 minutes and 6 minutes, adsorption of a phosphoric acid component, etc. was effected for 10 hours to obtain hydrogen peroxide aqueous solutions purified by adsorbing and removing the phosphoric acid component, etc., respectively.

The analytical results of the hydrogen peroxide aqueous solutions are shown in Table 2.

EXAMPLE 4

In the same manner as in Example 2 except for using the hydrogen peroxide aqueous solution obtained in Reference example 2, changing the active alumina particle A to the active alumina particle B, and also changing the feeding amount of the hydrogen peroxide aqueous solution and SV value as shown in Table 2, a hydrogen peroxide aqueous solution purified by adsorbing and removing phosphoric acid, etc. was obtained.

The analytical results of the purified hydrogen peroxide aqueous solution are shown in Table 2.

EXAMPLE 5

In the same manner as in Example 4 except changing (the active alumina particle B) to the active alumina particle C and also changing the feeding amount of the hydrogen peroxide aqueous solution and SV value as shown in Table 2, a hydrogen peroxide aqueous solution purified by adsorbing and removing a phosphoric acid component, etc. was obtained.

The analytical results of the hydrogen peroxide aqueous solution are shown in Table 2.

EXAMPLES 6 and 7

In the same manner as in Example 2 (active alumina particle A) and Example 4 (active alumina particle B) except for using the hydrogen peroxide aqueous solution obtained in Reference example 3 and changing the adsorption temperature to 10° C., hydrogen peroxide aqueous solutions purified by adsorbing and removing phosphoric acid, etc. were obtained, respectively.

The analytical results of the hydrogen peroxide aqueous solutions are shown in Table 2.

adsorption of phosphoric acid, etc. was carried out at 30° C. for 5 hours to obtain a purified hydrogen peroxide aqueous solution.

The analytical results of the hydrogen peroxide aqueous solution are shown in Table 3.

EXAMPLES 9 AND 10

In the same manner as in Example 8 except for using each 2 g of the active alumina particle B (Example 9) and the active alumina particle C (Example 10) shown in Table 1 as active alumina particles, purified hydrogen peroxide aqueous solution were obtained, respectively.

The analytical results of the hydrogen peroxide aqueous solutions are shown in Table 3.

EXAMPLE 11

In the same manner as in Example 8 except for using 35 g of the hydrogen peroxide aqueous solution obtained in Reference example 5 and 2 g of the active alumina particle D, and changing the adsorption temperature to 40° C. and the adsorption time to one hour, a hydrogen peroxide aqueous solution purified by adsorbing phosphoric acid, etc. was obtained.

The analytical results of the hydrogen peroxide aqueous solution are shown in Table 3.

TABLE 2

| Active alumina particle | | | | Adsorption conditions | | | | | Hydrogen peroxide aqueous solution after adsorption treatment | | |
|---|---|---|---|---|---|---|---|---|---|---|---|
| | | | Amount used (ml) | Adsorption temperature (°C.) | Feeding amount of hydrogen peroxide aqueous solution (ml/hr) | SV | Contact time (min) | Total time of adsorption operation (hr) | Average concentration of hydrogen peroxide (% by weight) | Average concentration of phosphoric acid component (ppm) | Removal rate of phosphoric acid component (%) |
| Type | Maker | Grade | | | | | | | | | |
| Example 1 | A | Mizusawa Kagaku Kogyo | RN | 100 | 30 | 200 | 2 | 30 | 10 | 59.4 | 2 | 99.5 |
| Example 2 | A | Mizusawa Kagaku Kogyo | RN | 100 | 30 | 500 | 5 | 12 | 10 | 59.8 | 3 | 99.3 |
| Example 3 | A | Mizusawa Kagaku Kogyo | RN | 100 | 30 | 1000 | 10 | 6 | 10 | 60.0 | 77 | 82.6 |
| Example 4 | B | Sumitomo Kagaku Kogyo | KHD-24 | 100 | 30 | 500 | 5 | 12 | 10 | 59.6 | 22 | 93.8 |
| Example 5 | C | Sumitomo Kagaku Kogyo | NKHD-24 | 100 | 30 | 500 | 5 | 12 | 10 | 59.7 | 17 | 95.2 |
| Example 6 | A | Mizusawa Kagaku Kogyo | RN | 100 | 10 | 500 | 5 | 12 | 10 | 60.0 | 6 | 98.6 |
| Example 7 | B | Sumitomo Kagaku Kogyo | KHD-24 | 100 | 10 | 500 | 5 | 12 | 10 | 60.0 | 24 | 94.8 |

EXAMPLE 8

By adding 2 g of the same active alumina particles (Type A) as those used in Example 1 to 39 g of the hydrogen peroxide aqueous solution obtained in Reference example 4 and stirring the mixture, the active alumina particles were dispersed in the hydrogen peroxide aqueous solution, and

EXAMPLE 12

The active alumina particles D to which a phosphoric acid component, etc. were adsorbed used in Example 11 were washed with a caustic soda aqueous solution (5% by weight) twice, then washed with pure water, further washed with a dilute nitric acid (2% by weight) and finally washed with pure water to prepare regenerated active alumina particles D.

In the same manner as in Example 11 except for using the above regenerated alumina particles D (regenerated D), a hydrogen peroxide aqueous solution purified by adsorbing phosphoric acid, etc. was obtained.

The analytical results of the hydrogen peroxide aqueous solution are shown in Table 3.

peroxide aqueous solution, a recovery vessel of a processing solution, and the respective feeding lines of a caustic soda aqueous solution (2% by weight), a nitric acid aqueous solution (0.5% by weight) and pure water, respectively.

Into the above second packed column 3 in which the above packed bed (L: 300 mm) packed with 100 ml volume

TABLE 3

| Active alumina particle | | | | Hydrogen peroxide aqueous solution | | Adsorption conditions | | Hydrogen peroxide aqueous solution after adsorption treatment | | Removal rate of phosphoric acid component (%) |
|---|---|---|---|---|---|---|---|---|---|---|
| Kind | | | A-mount used (g) | Average concentration of hydrogen peroxide (% by weight) | Average concentration of phosphoric acid component (ppm) | A-mount used (g) | Adsorption temperature (°C.) | Adsorption time (Stirring) (hr) | Average concentration of hydrogen peroxide (% by weight) | Average concentration of phosphoric acid component (ppm) | |
| Type | Maker | Grade | | | | | | | | | |
| Example 8 | A | Mizusawa Kagaku Kogyo | RN | 2 | 60.0 | 386 | 39 | 30 | 5 | 58.2 | 29.6 | 92.3 |
| Example 9 | B | Sumitomo Kagaku Kogyo | KHD-24 | 2 | 60.0 | 386 | 39 | 30 | 5 | 57.3 | 47.7 | 87.6 |
| Example 10 | C | Sumitomo Kagaku Kogyo | NKHD-24 | 2 | 60.0 | 386 | 39 | 30 | 5 | 57.5 | 83.2 | 78.4 |
| Example 11 | D | Sumitomo Kagaku Kogyo | KGD 1442 | 2 | 60.0 | 1740 | 35 | 40 | 1 | 59.4 | 55.1 | 96.8 |
| Example 12 | Regenerated D | Sumitomo Kagaku Kogyo | KGD 1442 | 2 | 60.0 | 1740 | 35 | 40 | 1 | 59.4 | 42.4 | 97.5 |

REFERENCE EXAMPLE 6

A reaction mixture containing hydrogen peroxide formed by oxidation and reduction of anthraquinones in the presence of a catalyst was extracted with water containing phosphoric acid to obtain an extract containing hydrogen peroxide. An organic solvent, etc. remaining the extract were removed by organic solvent extraction, and the resulting extract was purified and condensed to obtain a hydrogen peroxide aqueous solution [hydrogen peroxide ($H_2O_2$): 60% by weight, phosphoric acid component ($PO_4$): 362 ppm, other organic and inorganic components: 200 ppm or less].

EXAMPLE 13

As shown in FIG. 1, as the first packed column 2 and the second packed column 3, there was used the respective packed columns each comprising a tubular vessel with a length of 400 mm and an inner diameter of about 22 mm equipped with a feeding inlet of the hydrogen peroxide aqueous solution at the lower portion and a discharging outlet for discharging the hydrogen peroxide aqueous solution treated by adsorption at the upper portion and also surrounded by a cooling jacket, in which formed was a packed bed (a porous plate having a large number of pores with a pore diameter of 1 mm was provided at the bottom of the packed bed) packed with 100 ml of active alumina particles (Type A: produced by Mizusawa Kagaku Kogyo K. K., Active Alumina RN, rough composition is shown in Table 1) having an average particle size of 3 mm and a specific surface area of 180 m²/g with a packed height (L) of 300 mm. The above respective packed columns were set up perpendicularly and connected in a row to a feeding line of the hydrogen peroxide aqueous solution obtained from the extraction column 1, a product tank 4 of the hydrogen of the active alumina particles was formed, the hydrogen peroxide aqueous solution obtained in Reference example 1 described above was fed at a feeding rate of 400 ml/hr (SV value: 4). Under conditions of an adsorption temperature of 10° C. and a residence time of 15 minutes, adsorption of a phosphoric acid component, etc. was effected for 12 hours to obtain a hydrogen peroxide aqueous solution purified by adsorbing and removing the phosphoric acid component, etc., which was recovered in the product tank 4. (First time)

Subsequently, feeding of the hydrogen peroxide aqueous solution was changed to the first packed column 2, and the hydrogen peroxide aqueous solution was purified under the same conditions described above to obtain a purified hydrogen peroxide aqueous solution, which was recovered in the product tank 4. (Second time)

On the other hand, in the second packed column 3 which was used for removing a phosphoric acid component in the hydrogen peroxide aqueous solution described above and adsorb a phosphoric acid component, feeding of the hydrogen peroxide aqueous solution was terminated, and in the second packed column 3, the whole regenerating operations were carried out in the following manner while maintaining the temperature at 30° C.:

1) 500 ml/hr (SV value: 5) of pure water was fed for 1 hour to carry out water washing, 2) 500 ml/hr (SV value: 5) of an aqueous solution containing 2% by weight of caustic soda was fed for 2 hours to remove a phosphoric acid component from the active alumina particles, 3) subsequently, 500 ml/hr (SV value: 5) of pure water was fed for 1 hour to carry out water washing, 4) 500 ml/hr (SV value: 5) of an aqueous solution containing 0.5% by weight of nitric acid was fed for 0.5 hour, feeding of the nitric acid aqueous solution was terminated within 1 minute after the pH value of the processing solution became 5, a caustic soda component was removed from the active alumina particles, and 5) finally, 1,000 ml/hr (SV value: 10) of pure water was fed for 6 hours to carry out water washing, whereby the active alumina particles in the second packed column were regenerated.

Further, feeding of the above hydrogen peroxide aqueous solution was changed to the second packed column 3, and the hydrogen peroxide aqueous solution was purified in the same manner as described above (Third time) to obtain a purified hydrogen peroxide aqueous solution, which was recovered in the product tank 4. On the other hand, the active alumina particles in a saturated state in the first packed column 2 were regenerated in the same manner as described above.

Subsequently, removal of a phosphoric acid component from the hydrogen peroxide aqueous solution and regeneration of the active alumina particles in a saturated state were repeated twice.

The respective results (e.g. main composition of the resulting hydrogen peroxide aqueous solution, etc. ) in the above respective operations are shown in Table 4.

TABLE 4

| | Operation of regenerating active alumina particle | | | | | | | |
|---|---|---|---|---|---|---|---|---|
| | Treatment with aqueous NaOH | | | | Treatment with aqueous $HNO_3$ | | | |
| | Concentration wt % | Feeding rate (SV) | Feeding time (hr) | Eluted amount of Alumina component (ppm) | Concentration wt % | Feeding rate (SV) | Feeding time (hr) | Eluted amount of Alumina component (ppm) |
| First time | | | | | | | | |
| First packed column | — | — | — | — | — | — | — | — |
| Second packed column | — | — | — | — | — | — | — | — |
| Second time | | | | | | | | |
| First packed column | — | — | — | — | — | — | — | — |
| Second packed column | 2 | 5 | 2 | 1100 | 0.5 | 5 | 0.5 | 220 |
| Third time | | | | | | | | |
| First packed column | 2 | 5 | 2 | 1200 | 0.5 | 5 | 0.5 | 215 |
| Second packed column | — | — | — | — | — | — | — | — |
| Fourth time | | | | | | | | |
| First packed column | — | — | — | — | — | — | — | — |
| Second packed column | 2 | 5 | 2 | 520 | 0.5 | 5 | 0.5 | 150 |
| Fifth time | | | | | | | | |
| First packed column | 2 | 5 | 2 | 550 | 0.5 | 5 | 0.5 | 155 |
| Second packed column | — | — | — | — | — | — | — | — |

| | Removal of phosphoric acid component in hydrogen peroxide aqueous solution | | | Hydrogen peroxide aqueous solution after adsorption treatment | | | | |
|---|---|---|---|---|---|---|---|---|
| | Feeding rate of hydrogen peroxide aqueous solution (ml/hr) (SV) | Time of contact with active alumina (min) | Total time of each adsorption operation (hr) | Average concentration of hydrogen peroxide (wt %) | Decomposition rate of hydrogen peroxide (%) | Average concentration of phosphoric acid component (ppm) | Removal rate of phosphoric acid component (%) | Average concentration of nitric acid component (ppm) |
| First time | | | | | | | | |
| First packed column | — | — | — | — | — | — | — | — |
| Second packed column | 400 (4) | 15 | 12 | 60.0 | 0.07 | 7 | 98.1 | 0 |
| Second time | | | | | | | | |
| First packed column | 400 (4) | 15 | 12 | 59.9 | 0.08 | 9 | 97.5 | 0 |
| Second packed column | — | — | — | — | — | — | — | — |
| Third time | | | | | | | | |
| First packed column | — | — | — | — | — | — | — | — |
| Second packed column | 400 (4) | 15 | 12 | 59.9 | 0.14 | 14 | 96.1 | 24 |
| Fourth time | | | | | | | | |
| First packed column | 400 (4) | 15 | 12 | 59.9 | 0.15 | 15 | 95.9 | 25 |
| Second packed column | — | — | — | — | — | — | — | — |
| Fifth time | | | | | | | | |
| First packed column | — | — | — | — | — | — | — | — |
| Second packed column | 400 (4) | 15 | 12 | 59.9 | 0.16 | 17 | 95.3 | 25 |

According to the purification process of this invention, a phosphoric acid component, etc. in a hydrogen peroxide aqueous solution containing a large amount of a phosphoric acid component obtained from a reaction mixture formed by the anthraquinone method can be effectively adsorbed to active alumina particles substantially without causing decomposition of hydrogen peroxide in said aqueous solution; active alumina particles to which a phosphoric acid component is adsorbed in a saturated state can be easily regenerated with an inorganic base aqueous solution and a low concentration inorganic acid aqueous solution so as to minimize elution of an alumina component from the active alumina particles and also prevent problems of decomposition of hydrogen peroxide, removal rate of a phosphoric acid component, contamination with unnecessary impurities, etc. when the regenerated active alumina particles are reused for a hydrogen peroxide aqueous solution; and a hydrogen peroxide aqueous solution from which a phosphoric acid component is removed can be obtained industrially and efficiently by reusing the regenerated active alumina particles for removing a phosphoric acid component from a hydrogen peroxide aqueous solution.

We claim:

1. A process for purifying a hydrogen peroxide aqueous solution, which comprises bringing a hydrogen peroxide aqueous solution containing 50 to 10,000 ppm of a phosphoric acid component obtained by extracting with water a reaction mixture containing hydrogen peroxide formed by an oxidation-reduction process of anthraquinones, into contact with active alumina particles containing 90% or more of an alumina component in terms of $Al_2O_3$ and having a specific surface area of 100 to 600 $m^2/g$ at a temperature of 0° to 50° C. for 6 to 500 minutes to remove the phosphoric acid component from the hydrogen peroxide aqueous solution.

2. The process according to claim 1, wherein said active alumina particles are active γ-alumina particles containing 95% by weight or more of an alumina component and having a specific surface area of 120 to 500 $m^2/g$.

3. The process according to claim 1, wherein said active alumina particles have a particle size of 3 to 50 mesh.

4. The process according to claim 1, wherein said active alumina particles contain 0.1% by weight or less of iron atom in terms of $Fe_2O_3$, each 10 ppm or less of chromium, copper and nickel atoms, and 0.3% by weight or less of a sodium component in terms of $Na_2O$.

5. The process according to claim 1, wherein said active alumina particles contain 0.05% by weight or less of iron atom in terms of $Fe_2O_3$, each 10 ppm or less of chromium, copper and nickel atoms, and 0.1% by weight or less of a sodium component in terms of $Na_2O$.

6. The process according to claim 1, wherein the process further comprises bringing said active alumina particles lowered in property of removing a phosphoric acid component due to attachment of a large amount of a phosphoric acid component in a substantially saturated state into contact with an inorganic base aqueous solution to elute and remove the phosphoric acid component from said particles, and then bringing said active alumina particles into contact with 10% by weight or less of an inorganic acid aqueous solution to remove an inorganic base component from said particles, if necessary, followed by washing with water, to regenerate the active alumina particles and reusing the above regenerated active alumina particles for removing a phosphoric acid component from the hydrogen peroxide aqueous solution containing an phosphoric acid component obtained by extracting with water a reaction mixture containing hydrogen peroxide formed by the oxidation-reduction process of anthraquinones.

7. The process according to claim 6, which comprises feeding a hydrogen peroxide aqueous solution containing a phosphoric acid component obtained by extracting with water a reaction mixture containing hydrogen peroxide formed by an oxidation-reduction process of anthraquinones, into the first packed column in which active alumina particles are packed to remove the phosphoric acid component from said hydrogen peroxide aqueous solution by adsorbing it to the active alumina particles, and simultaneously with after terminating feeding of the hydrogen peroxide aqueous solution into the second packed column packed with active alumina particles to which a large amount of a phosphoric acid component is adsorbed in a substantially saturated state so that property of removing a phosphoric acid component is lowered, feeding an inorganic base aqueous solution into said second packed column to elute and remove the phosphoric acid component from said particles, and then feeding 10% by weight or less of an inorganic acid aqueous solution into the second packed column to remove an inorganic base component from said particles, and when the pH of the treated aqueous solution discharged from said packed column becomes about 4 to 6, terminating feeding of the inorganic acid aqueous solution within about 5 minutes, and finally feeding water into said packed column and washing with water to regenerate the active alumina particles within the second packed column, and repeating removal of a phosphoric acid component in the hydrogen peroxide aqueous solution and regeneration of the active alumina particles, alternately in the above first packed column and second packed column.

8. The process according to claim 1, wherein said hydrogen peroxide aqueous solution is brought into contact with said active alumina particles at 5° to 40° C. for 6 to 200 minutes.

9. The process according to claim 1, wherein said active alumina particles are filled with a packed density of 500 to 1000 g/liter.

10. The process according to claim 1, wherein the hydrogen peroxide aqueous solution is fed with a feeding amount of peroxide aqueous solution/volume of active alumina particle bed of 0.5 to 10.

11. The process according to claim 1, wherein said contact time is 8 to 500 minutes.

12. The process according to claim 1, wherein said contact time is 10 to 500 minutes.

* * * * *